US007603456B2

(12) United States Patent  (10) Patent No.: US 7,603,456 B2
Lee  (45) Date of Patent: Oct. 13, 2009

(54) SYSTEM AND METHOD FOR SECURING REMOTE ADMINISTRATIVE ACCESS TO A PROCESSING DEVICE

(75) Inventor: Sheng Lee, Irvine, CA (US)

(73) Assignees: Kabushiki Kaisha Toshiba (JP); Toshiba Tec Kabushiki Kaisha (JP)

(*) Notice: Subject to any disclaimer, the term of this patent is extended or adjusted under 35 U.S.C. 154(b) by 50 days.

(21) Appl. No.: 11/758,987

(22) Filed: Jun. 6, 2007

(65) Prior Publication Data

US 2007/0260722 A1 Nov. 8, 2007

Related U.S. Application Data

(63) Continuation-in-part of application No. 10/675,708, filed on Sep. 30, 2003, now abandoned.

(51) Int. Cl.
*G06F 15/173* (2006.01)
(52) U.S. Cl. ............................. 709/223; 726/11; 726/13; 709/224; 709/229
(58) Field of Classification Search ................. 709/223, 709/224, 229; 726/3–21
See application file for complete search history.

(56) References Cited

U.S. PATENT DOCUMENTS

| 5,819,015 | A | * | 10/1998 | Martin et al. | ............... | 358/1.15 |
| 5,832,298 | A | * | 11/1998 | Sanchez et al. | ................ | 710/8 |
| 5,901,286 | A | * | 5/1999 | Danknick et al. | ........... | 709/203 |
| 5,956,487 | A | * | 9/1999 | Venkatraman et al. | ...... | 709/218 |
| 6,184,996 | B1 | * | 2/2001 | Gase | ......................... | 358/1.15 |
| 6,292,267 | B1 | * | 9/2001 | Mori et al. | .................. | 358/1.15 |
| 6,378,070 | B1 | * | 4/2002 | Chan et al. | .................. | 713/155 |

| 6,449,053 | B2 | * | 9/2002 | Bando | ....................... | 358/1.15 |

(Continued)

FOREIGN PATENT DOCUMENTS

EP 909072 A2 * 4/1999

(Continued)

OTHER PUBLICATIONS

F. Baker, "RFC 1812—Requirements for IP Version 4 Routers", Request for Comments, Jun. 1995, XP015007599, pp. 1-175.

(Continued)

*Primary Examiner*—Kenny S Lin
*Assistant Examiner*—Tauqir Hussain
(74) *Attorney, Agent, or Firm*—Tucker Ellis & West LLP

(57) ABSTRACT

The subject application is directed to a system and method for securing remote administrative access to a processing device. Incoming data packets, including source data, destination data, and a data portion for administrative control of a processing device are received at a designated port associated with administrative control. Binary mask data defining an address space from which control is acceptable is then received. Binary reference address data representing an address with an address range within the address space is received. A first binary value is generated via a comparison of the reference data and the mask data. A second binary value is generated via a comparison of an incoming data packet and the mask data. The acceptability of the packet is determined based on comparing the first value with the second value. Processing of received administrative control by the processing device is then selectively commenced based on the value comparison.

18 Claims, 6 Drawing Sheets

U.S. PATENT DOCUMENTS

| | | | |
|---|---|---|---|
| 6,697,073 B1 * | 2/2004 | Kadota | 345/501 |
| 6,987,768 B1 * | 1/2006 | Kojima et al. | 370/401 |
| 7,065,564 B2 * | 6/2006 | Machida | 709/222 |
| 7,142,322 B2 * | 11/2006 | Lee | 358/1.15 |
| 7,248,578 B2 * | 7/2007 | Lumley | 370/389 |
| 7,249,188 B2 * | 7/2007 | Spicer et al. | 709/229 |
| 7,298,512 B2 * | 11/2007 | Reese et al. | 358/1.15 |
| 2001/0000193 A1 * | 4/2001 | Boden et al. | 713/201 |
| 2001/0043355 A1 * | 11/2001 | Bando | 358/1.15 |
| 2002/0007422 A1 * | 1/2002 | Bennett | 709/246 |
| 2002/0078200 A1 | 6/2002 | Helms | |
| 2002/0078231 A1 | 6/2002 | Chang et al. | |
| 2002/0083131 A1 * | 6/2002 | Machida | 709/203 |
| 2002/0169884 A1 * | 11/2002 | Jean et al. | 709/230 |
| 2002/0174362 A1 | 11/2002 | Ullmann et al. | |
| 2002/0196460 A1 * | 12/2002 | Parry | 358/1.15 |
| 2003/0018591 A1 * | 1/2003 | Komisky | 706/1 |
| 2003/0072318 A1 | 4/2003 | Lam et al. | |
| 2003/0074428 A1 | 4/2003 | Haines | |
| 2003/0084331 A1 | 5/2003 | Dixon et al. | |
| 2003/0093670 A1 * | 5/2003 | Matsubayashi et al. | 713/168 |
| 2003/0160989 A1 * | 8/2003 | Chapin et al. | 358/1.13 |
| 2004/0098506 A1 * | 5/2004 | Jean | 709/245 |
| 2004/0117488 A1 * | 6/2004 | McNamee | 709/229 |
| 2004/0184106 A1 * | 9/2004 | Ferlitsch | 358/2.1 |
| 2004/0207866 A1 * | 10/2004 | Heiney et al. | 358/1.15 |
| 2004/0250131 A1 | 12/2004 | Swander et al. | |
| 2005/0002056 A1 * | 1/2005 | Lee | 358/1.15 |
| 2005/0088685 A1 * | 4/2005 | Lee | 358/1.15 |
| 2006/0206605 A1 * | 9/2006 | Machida | 709/223 |
| 2006/0262350 A1 * | 11/2006 | Lee | 358/1.15 |
| 2007/0289017 A1 * | 12/2007 | Copeland | 726/23 |
| 2007/0297006 A1 * | 12/2007 | Ohshima | 358/1.15 |
| 2008/0052711 A1 * | 2/2008 | Forin et al. | 718/100 |

FOREIGN PATENT DOCUMENTS

| | | |
|---|---|---|
| EP | 0 909 072 A3 | 7/2003 |

OTHER PUBLICATIONS

Thomas Y.C. Woo, "A Modular Approach to Packet Classification: Algorithms and Results", IEEE Infocom 2000, pp. 1213-1222.

"Cert® Advisory CA-2002-03 Multiple Vulnerabilities in Many Implementations of the Simple Network Management Protocol (SNMP)", XP-002320652, Jul. 27, 2004.

J. Case: "RFC 1157— A Simple Network Managment Protocol (SNMP)", Request for Comments, May 1990, pp. 1-36.

* cited by examiner

SNMP Filters Assignment

| | | Reference Address | Mask |
|---|---|---|---|
| ☑ Enable | ○ Allow ● Reject | 159 . 119 . 45 . 1 | 255 . 255 . 255 . 240 |
| ☑ Enable | ● Allow ○ Reject | 159 . 119 . 45 . 0 | 255 . 255 . 255 . 240 |
| ☑ Enable | ● Allow ○ Reject | 159 . 119 . 69 . 0 | 255 . 255 . 255 . 240 |
| ☐ Enable | ○ Allow ○ Reject | . . . | . . . |
| ☐ Enable | ○ Allow ○ Reject | . . . | . . . |
| ☐ Enable | ○ Allow ○ Reject | . . . | . . . |

OK    Cancel

*FIGURE 6*

SYSTEM AND METHOD FOR SECURING REMOTE ADMINISTRATIVE ACCESS TO A PROCESSING DEVICE

CROSS-REFERENCE TO RELATED APPLICATIONS

This application is a continuation-in-part of U.S. patent application Ser. No. 10/675,708, filed Sep. 30, 2003 now abandoned, and titled SNMP PACKET FILTERING FOR PRINTING DEVICES.

BACKGROUND OF THE INVENTION

The subject application is directed generally to computer network administration. More particularly, the subject application is directed to filtering data packets using communications protocols so as to prevent unauthorized access to networked devices.

Computer based networks, such as the Internet, transmit packets of information across its system. A packet is a sequence of binary digits, including data and control signals, that is transmitted and switched as a composite whole. The data, control signals, and possibly error control information, are arranged in a specific format. These formats may be expressed in the form of a protocol. A protocol is a formal set of conventions governing the format and control of interaction among communicating functional units. Protocols may govern portions of a network, types of services, or even administrative procedures. In a layered communications system architecture, such as the Internet, an intranet, Ethernet, or other computer network, a protocol is a formal set of procedures that are adopted to facilitate functional interoperation within that layered hierarchy. A resultant use of protocols is the ability of information systems to exchange information.

Most computer networks use the transmission control protocol, or TCP. The transmission control protocol is a network protocol that controls host-to-host transmissions over packet-switched communications networks. Acting in concert with TCP is the Internet protocol, or IP protocol. The IP protocol is a standard protocol designed for use in interconnected systems of packet-switched computer networks. The IP protocol provides for transmitting blocks of data called datagrams from sources to destinations, where sources and destinations are hosts identified by fixed-length addresses. The Internet protocol also provides for fragmentation and reassembly of long datagrams, if necessary, for transmission through small-packet networks. Fragmentation involves the breaking down of a long datagram into multiple datagrams, which are then transmitted and reassembled at the destination computer. The Transmission Control Protocol/Internet Protocol, or TCP/IP, controls how datagrams, or packets, are transmitted over the Internet. The TCP/IP are two interrelated protocols that are part of the Internet protocol suite. While TCP operates on the OSI Transport Layer and breaks data down into packets, IP operates on the OSI Network Layer and handles the routing of packets over the computer network.

Simple Network Management Protocol, or SNMP, is a TCP/IP standard protocol that (a) is used to manage and control IP gateways and the networks to which they are attached, (b) uses IP directly, bypassing the masking effects of TCP error correction, (c) has direct access to IP datagrams on a network that may be operating abnormally, thus requiring management, (d) defines a set of variables that the gateway must store, and (e) specifies that all control operations on the gateway are a side-effect of fetching or storing those data variables, i.e., operations that are analogous to writing commands and reading status.

Modern digital printing devices are often sophisticated enough to provide up-to-date device and print job status to administrators and users through the network protocols, described above. Using SNMP, an administrator is able to not only remotely access the device, but also able to remotely configure the device. Although very powerful as a management protocol, SNMP has one serious drawback, which is the lack of adequate security. SNMP has very limited security built into it. In a computer network, this equates to any user capable of viewing the resources available on a device. Virtually all users who have visibility to the printing device will be able to retrieve or even modify the device parameters. Visibility, as used herein means having the awareness of the status of a resource, which may or may not involve actually monitoring the resource.

Without built-in security features, it is desirable to have some mechanism for administrators to restrict visibility of the device to a smaller group of users. Enterprise firewalls are capable of blocking SNMP traffic from the Internet, however these do little to prevent SNMP access on the intranet side of the firewall. Although routers are capable of filtering network packets, there may not be a router located on an intranet.

SUMMARY OF THE INVENTION

In accordance with one embodiment of the subject application, there is provided a system and method for computer network administration.

Further, in accordance with one embodiment of the subject application, there is provided a system and method for filtering data packets using communications protocols so as to prevent unauthorized access to networked devices.

Still further, in accordance with one embodiment of the subject application, there is provided a method and system capable of restricting visibility of a device on a network, capable of implementation on any IP-based network, provide an alternative to network traffic management without adding a sophisticated router, and have minimal impact upon performance.

Further, in accordance with one embodiment of the subject application, there is provided a system for securing remote administrative access to a processing device. The system includes means adapted for receiving a series of incoming binary data packets at a designated port associated with administrative control of an associated processing device, each data packet including source data, destination data, and a data portion adapted for communicating administrative control data for administrative control of the processing device. The system further includes means adapted for receiving binary mask data defining an address space from which administrative control is acceptable and means adapted for receiving binary reference address data representative of at least one address within an address range defined by the address space. Additionally, the system comprises means adapted for generating a first binary value in accordance with a comparison binary reference data with mask data and means adapted for generating a second binary value in accordance with a comparison of an incoming data packet with mask data. Furthermore, the system incorporates determining means adapted for determining acceptability of incoming binary data packets in accordance with a comparison of first and second binary values associated therewith, and means adapted for selectively commencing processing of received administrative control by the processing device data in accordance with an output of the determining means.

In one embodiment of the subject application, the determining means further includes means adapted for determining acceptable incoming binary data as that disposed within the address range in accordance with a received range allow instruction.

In another embodiment of the subject application, the determining means includes means adapted for determining acceptable incoming binary data as that disposed outside the address range in accordance with a received range reject instruction.

In yet another embodiment of the subject application, the first and second binary values are generated by completion of a respective logical AND operations between mask data with received binary reference data and mask data with an incoming data packet.

In a further embodiment of the subject application, the system also includes means adapted for receiving additional binary mask data defining at least one additional corresponding address space from which administrative control is acceptable and means adapted for receiving additional binary reference address data representative of at least one additional corresponding address within an address range defined thereby. In such an embodiment, the system further includes means adapted for generating at least one additional first binary value, each corresponding to a comparison of additional binary reference data with mask data and means adapted for generating at least one additional second binary value in accordance with a comparison of an incoming data packet with additional binary mask data. In addition, the determining means includes means adapted for determining acceptability of incoming binary data packets in accordance with a comparison of additional first and second binary values.

In one embodiment of the subject application, the mask data and reference address data is received via an associated thin client interface.

Still further, in accordance with one embodiment of the subject application, there is provided a method for securing remote administrative access to a processing device in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including:

FIG. 6 is a screen illustrating a graphical user interface implemented in accordance with the method for securing remote administrative access to a processing device according to one embodiment of the subject application.

DETAILED DESCRIPTION OF THE PREFERRED EMBODIMENT

The subject application is directed to a system and method for computer network administration. In particular, the subject application is directed to a system and method for filtering data packets using communications protocols so as to prevent unauthorized access to networked devices. More particularly, the subject application is directed to a system and method capable of restricting visibility of a device on a network, capable of implementation on any IP-based network, provide an alternative to network traffic management without adding a sophisticated router, and have minimal impact upon performance. It will become apparent to those skilled in the art that the system and method described herein are suitably adapted to a plurality of varying electronic fields employing remote administrative controls, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
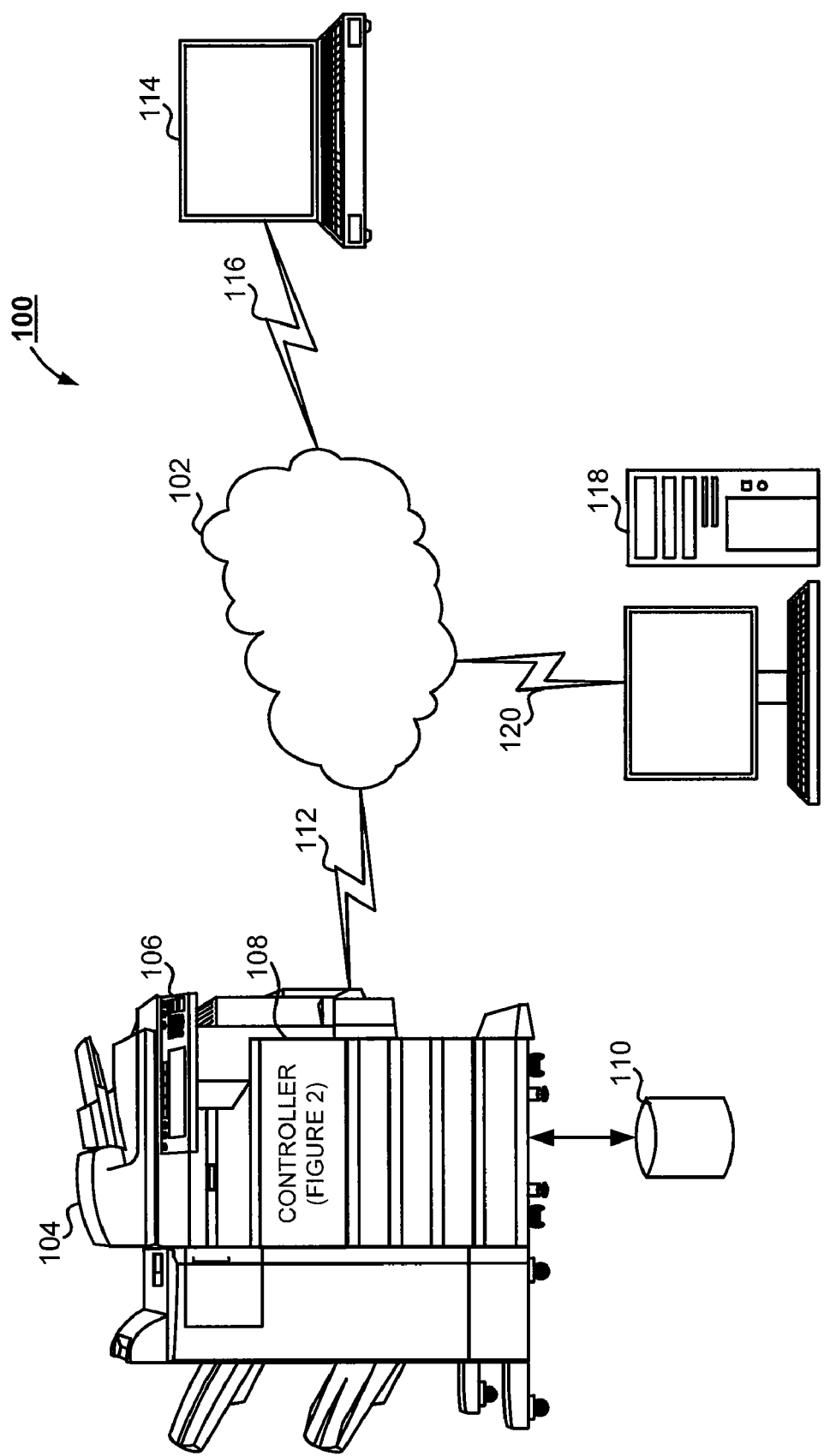
FIG. 1 is an overall diagram of a system for securing remote administrative access to a processing device according to one embodiment of the subject application.

Referring now to FIG. 1, there is shown an overall diagram of a system 100 for securing remote administrative access to a processing device in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11 (x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11 g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for securing remote administrative access to a processing device of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11 g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

In addition, the system 100 of FIG. 1 further includes an administrative device 118, communicatively coupled to the computer network 102 via a communications link 120. It will be understood by those skilled in the art that the administrative device 118 is shown in FIG. 1 as a personal computer for illustration purposes only. As will be appreciated by the skilled artisan, the administrative device 118 is representative of any personal computing device known in the art, including, for example and without limitation, a computer workstation, a laptop computer, a personal data assistant, a web-enabled cellular telephone, a smart phone, a proprietary network device, or other web-enabled electronic device. The communications link 120 is any suitable channel of data communications known in the art including, but not limited to wireless communications, for example and without limitation, Bluetooth, WiMax, 802.11a, 802.11b, 802.11 g, 802.11(x), a proprietary communications network, infrared, optical, the public switched telephone network, or any suitable wireless data transmission system, or wired communications known in the art. Preferably, the administrative device 118 is suitably adapted to generate and transmit electronic documents, document processing instructions, user interface modifications, upgrades, updates, personalization data, administrative control data, configuration data, or the like, to the document processing device 104, or any other similar device coupled to the computer network 102. In accordance with one embodiment of the subject application, the administrative device 118 is capable of employing a suitable thin client, via which command and control data is capable of being communicated to the document processing device 104.

Figure 2:
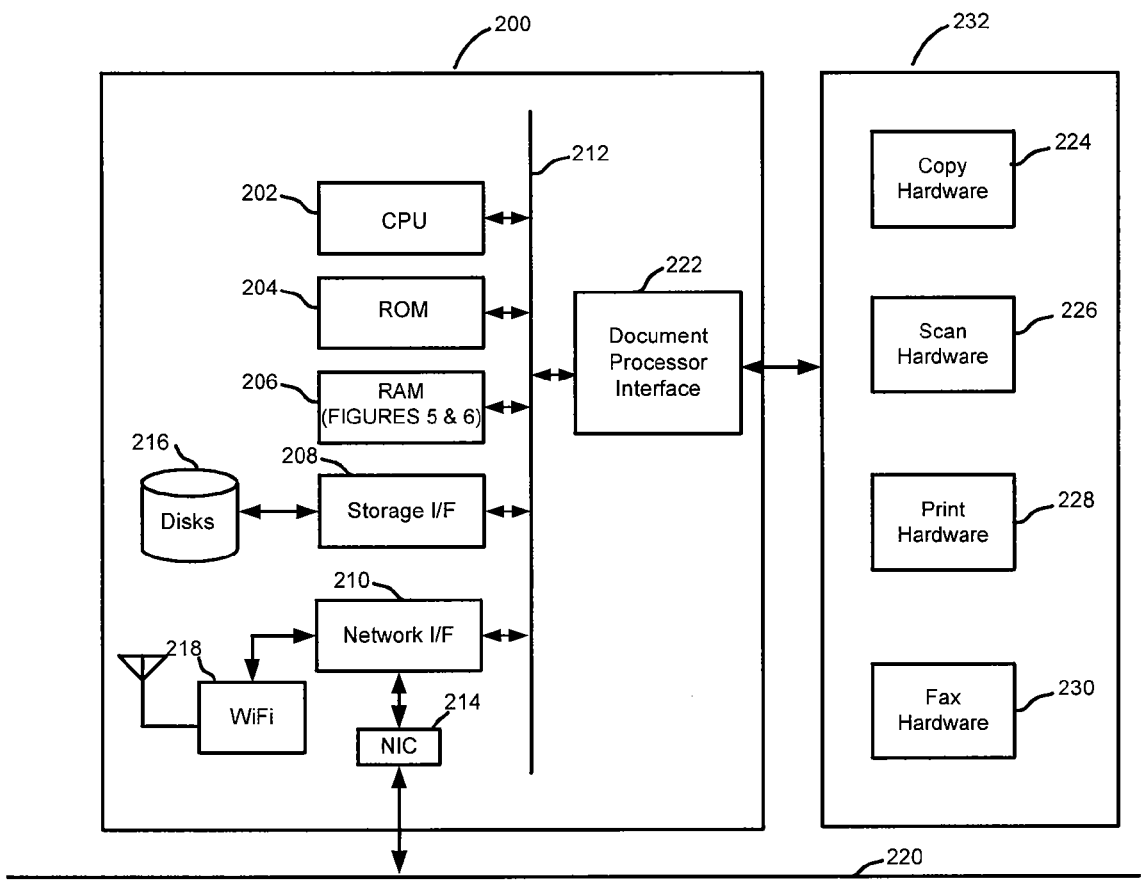
FIG. 2 is a block diagram illustrating controller hardware for use in the system for securing remote administrative access to a processing device according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
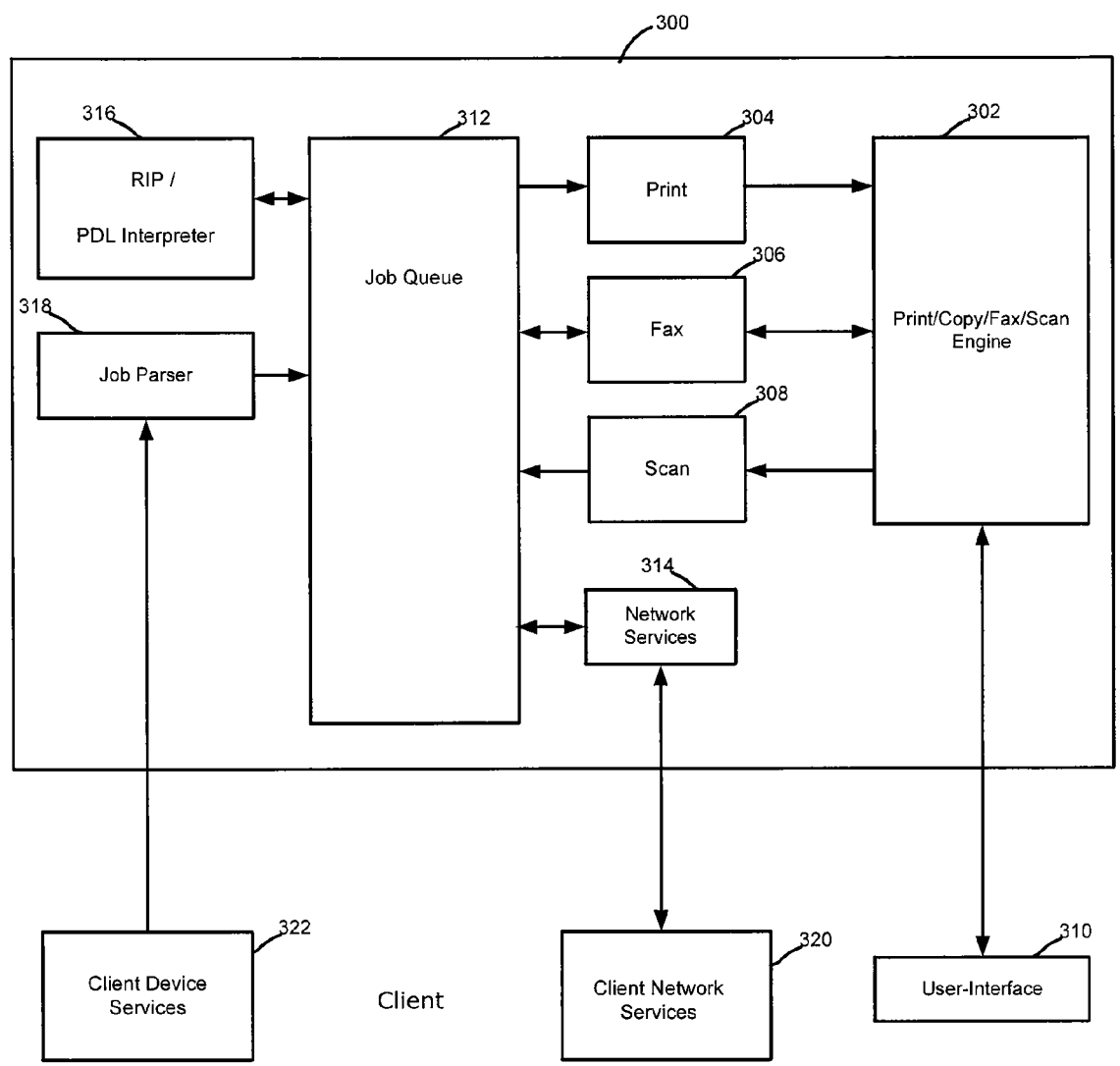
FIG. 3 is a functional diagram illustrating the controller for use in the system for securing remote administrative access to a processing device according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

In operation, a series of incoming binary data packets are received at a designated port associated with administrative control of an associated processing device, with each data packet including source data, destination data, and a data portion adapted for communicating administrative control data for administrative control of the processing device. Binary mask data defining an address space from which administrative control is acceptable is then received. Binary reference address data representing an address with an address range defined by the address space is then received. A first binary value is then generated in accordance with a comparison of the binary reference data and the mask data. A second binary value is generated in accordance with a comparison of an incoming data packet and the mask data. The acceptability of the incoming binary data packets is then determined in accordance with the results of a comparison of the first binary value with the second binary value. Processing of received administrative control by the processing device is then selectively commenced in accordance with the output of the determination made from the comparison of the first and second binary values.

In accordance with one example embodiment of the subject application, a binary mask is first received from an associated administrative user by the controller 108 or other suitable component of the document processing device 104. According to one embodiment, the administrative user is capable of communicating command and control information from the administrative device 118 to the document processing device 104 via a suitable thin client interface. Preferably, a graphical user interface is generated via the administrative device 118 to facilitate the entry of command and control data, such as filters, as will be understood by those skilled in the art. The communication of control data to the document processing device 104 is capable of being accomplished via a suitable network protocol, such as, for example and without limitation, a simple network management protocol (SNMP), or the like.

A binary reference address within a range of addresses defined by the address space of the mask data is then received from the administrator via the administrative device 118. An action instruction is then received from the administrative user corresponding to an action to be performed upon the receipt of an incoming data packet having a source address within the address range defined by the mask and the reference address. That is, the administrative user sets the filter to either allow the incoming data packet, enabling the processing of control commands contained therein, or to reject the incoming data packet, whereupon the data is ignored and the application sending the data is kept ignorant of the blocking of the packet. The received mask data and reference address are then stored as a filter by the controller 108 or other suitable component of the document processing device 104 via the storage device 110.

A determination is then made whether another filter is to be added via the graphical user interface displayed on the administrative device 118 via the thin client. When another filter is added, the administrative user is prompted to input a binary mask defining an additional corresponding address space. A reference address associated with the additional binary mask is then received from the administrative device 118 by the controller 108 associated with the document processing device 104. A desired action, e.g., allow or reject, is then received from the administrative user indicating whether the controller 108 is to allow the processing of command instructions in an incoming data packet or reject such processing when the source address of the incoming data packet falls within the range defined by the additional mask data and the corresponding reference address. Thereafter, the additional filter is stored in the data storage device 110 for implementation by the controller 108 upon receipt of any incoming data packets.

When no additional filters are input by the administrative user, the filters reside in the data storage device 110 until an incoming binary data packet is received by the controller 108. Upon receive of an incoming binary data packet, the filter or filters set by the administrative user are initiated and the source address of the first incoming data packet is determined. In accordance with one embodiment of the subject application, the source address corresponds to data representing the originating device, e.g., the user device 114, as included in the data packet.

A first binary value is then generated by the controller 108 corresponding to a logical AND operation performed on the binary mask data and the reference address data. A second binary value is then generated via the performance of a logical AND operation on the binary mask data and the source address of the incoming data packet. The first and second binary values are then compared to determine whether the two values match. When a match is determined, i.e., the source address falls within the range of addresses defined by the mask and the reference address, the action associated with the filter is then invoked. When the instruction is an allow command, the data portion of the packet adapted for communicating administrative control data for administrative control of the document processing device 104 is allowed and processed via the controller 108 or other suitable component associated with the document processing device 104. When the action set by the administrative user is a reject command, the incoming data packet administrative control data is ignored, e.g., it is not passed on to the controller 108 for implementation. A determination is then made whether or not an additional incoming data packet has been received.

When an additional incoming data packet has been received, operations return to generate a first binary value via the performance of a logical AND operation between the mask data and the reference address data. A second binary value is then generated via a logical AND operation between the mask data and the source address of the additional incoming data packet. The first and second binary values generated with respect to the additional incoming data packet are then compared to determine whether the source address of the additional incoming data packet falls within the range specified by the filter. When the comparison does not result in a match of the results of the logical AND operations, a determination is made whether an additional filter is present. When another filter is present, a first binary value is generated via a logical AND operation of the mask data of the additional filter and the corresponding reference address data. A second binary value is generated via a logical AND operation of the additional filter mask data and the source address of the additional data packet. The first and second binary values are then compared to determine whether a match has occurred. When a match has been determined, operations continue as set forth above with the filter performing the set action, e.g., allow or reject, the additional incoming data packet.

When no additional filters are present, and the first and second binary values of the additional incoming data packet do not match the last filter set by the administrative user, a determination is made as to the action, allow or reject, set for the last filter available. When the action associated with the last filter is an allow instruction, the additional incoming data packet is rejected. When the action associated with the last filter is a reject instruction, the additional incoming data packet is allowed, whereupon the administrative control of the document processing device 104 is selectively commenced in accordance with the administrative control data contained within the additional incoming data packet. The skilled artisan will appreciate that such operations continue for each incoming binary data packet received by the document processing device 104. Thus, the administrative user is able to set, for example, an allow instruction for data packets originating from the network address of the administrative device 118, while setting a filter to reject data packets originating from the network address of the user device 114.

It will be appreciated by those skilled in the art that the port number associated with a protocol or application is not needed as protocol filtering is not implemented in accordance with the subject application. Rather, as will be understood by those skilled in the art, the filters of the subject application are implemented in accordance with SNMP service for packets destined to a fixed port, i.e., port 161 for SNMP. In accordance with one embodiment of the subject application, the mask is a 32-bit mask, or a bitmap, which specifies the bits in the reference address that need to be matched by the source address of the incoming packet. The positions with zero bits are the positions in the address that are ignored.

Thus, in accordance with one example embodiment of the subject application, a user associated with the administrative device 118 desires to block all but traffic originating from an Internet Protocol ("IP") address range of 159.119.44.0 to 159.119.45.255. Accordingly, via a suitable graphical user interface, such as that illustrated in FIG. 6, the administrative user specifies a filter with an action set as "allow", a reference address set as 159.119.45.168, and a mask as 255.255.254.0. It will be appreciated by those skilled in the art that the reference address is capable of comprising any address within the desired range. The mask of 255.255.254.0 indicates that the two most significant octets, i.e., 159.119, in the source address of an incoming packet must match the same two octets of the reference address, i.e., 159.119. The least significant bit of the third octet and the entire fourth octet are not checked while comparing the two addresses. Therefore, the skilled artisan will appreciate that the two most significant octets of the source address must be 159 and 119, respectively, and the least significant octet is capable of being any number 0-255. It will also be understood by those skilled in the art that the third octet is capable of being either 44 or 45 because the least significant bit is capable of being either 0 or 1.

Thus, when an incoming packet is received by the filter, the source address of the incoming packet is identified and the process begins with generating a first binary value from a logical AND operation of the mask (255.255.254.0) and the reference address (159.119.45.168):

| | |
|---|---|
| Mask: | 11111111.11111111.11111110.00000000 |
| AND | |
| Reference Address: | 10011111.01110111.00101101.10101000 |
| EQUALS | |
| First Binary Value: | 10011111.01110111.0010110x.xxxxxxxx; |
| where x can be 1 or 0. | |

A second binary value is the generated from the source address of the incoming data packet, for example 159.119.44.110, via a logical AND operation of the mask (255.255.254.0) and the source address (159.119.44.110):

| | |
|---|---|
| Mask: | 11111111.11111111.11111110.00000000 |
| AND | |
| Source Address: | 10011111.01110111.00101100.01101100 |
| EQUALS | |
| Second Binary Value: | 10011111.01110111.00101100.00000000. |

The first and second binary values are then compared to determine whether a match has occurred. That is, whether the first and second octets match and whether the third octet is 44 or 45 (as the least significant bit of the third octet and the entire fourth octet is ignored). As the preceding example indicates, the source address of the incoming data packet does fall within the address range of 159.119.44.0 to 159.119.45.255. Thereafter, the filter performs the action specified by the administrative user, e.g., allows the packet.

Had the source address of the incoming packet fallen outside the specified range, the packet would be ignored. For example, had the source address been 159.119.168.254:

| | |
|---|---|
| Mask: | 11111111.11111111.11111110.00000000 |
| AND | |
| Source Address: | 10011111.01110111.10101000.11111110 |
| EQUALS | |
| Second Binary Value: | 10011111.01110111.10101000.00000000. |

A comparison of the first and second binary values would then indicate that a match did not occur, as the third octet is substantially different. That is, the first octets and the second octets match, but the third octets do not correspond. The opposite action of the action specified for the filter, i.e., reject, would then be followed and the incoming data packet would be ignored. It will be understood by those skilled in the art that upon the determination that the two binary values do not match, the incoming data packet would then be subjected to any additional filters present on the document processing device 104 until a match is found or all filters have been applied. Thereafter, the opposite of the action of the last filter on the document processing device 104 would be applied, e.g., if the action of the last filter is an allow action, the incoming data packet is ignored, and if the action of the last filter is a reject action, the incoming data packet would be allowed.

Figure 4:
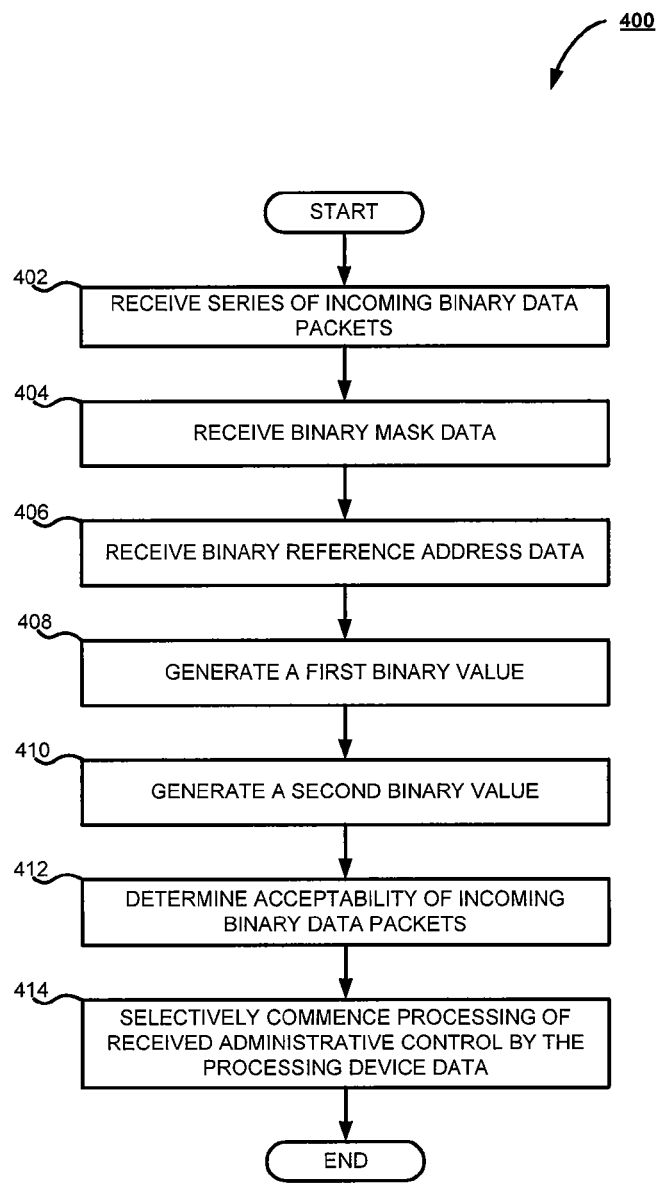
FIG. 4 is a flowchart illustrating a method for securing remote administrative access to a processing device according to one embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4, FIG. 5, and FIG. 6. Turning now to FIG. 4, there is shown a flowchart 400 illustrating a method for securing remote administrative access to a processing device in accordance with one embodiment of the subject application. Beginning at step 402, a series of incoming binary data packets are received at a designated port associated with administrative control of an associated processing device. In accordance with one embodiment of the subject application, the port is port 161 associated with SNMP data packets. Preferably, each data packet includes source data, destination data, and a data portion adapted for communicating administrative control data for administrative control of the processing device, e.g., the document processing device 104. Binary mask data, which defines an address space from which administrative control is acceptable is then received at step 404. At step 406, binary reference address data representing an address with an address range defined by the address space is then received.

A first binary value is then generated at step 408 in accordance with a comparison of the binary reference data and the mask data. At step 410, a second binary value is generated based upon the comparison of an incoming data packet with the mask data. The acceptability of the incoming binary data packets is then determined, at step 412, in accordance with the results of a comparison of the first binary value with the second binary value. At step 414, processing of received administrative control by the processing device 104 is then selectively commenced in accordance with the output of the acceptability determination made from the comparison of the first and second binary values.

Figure 5:
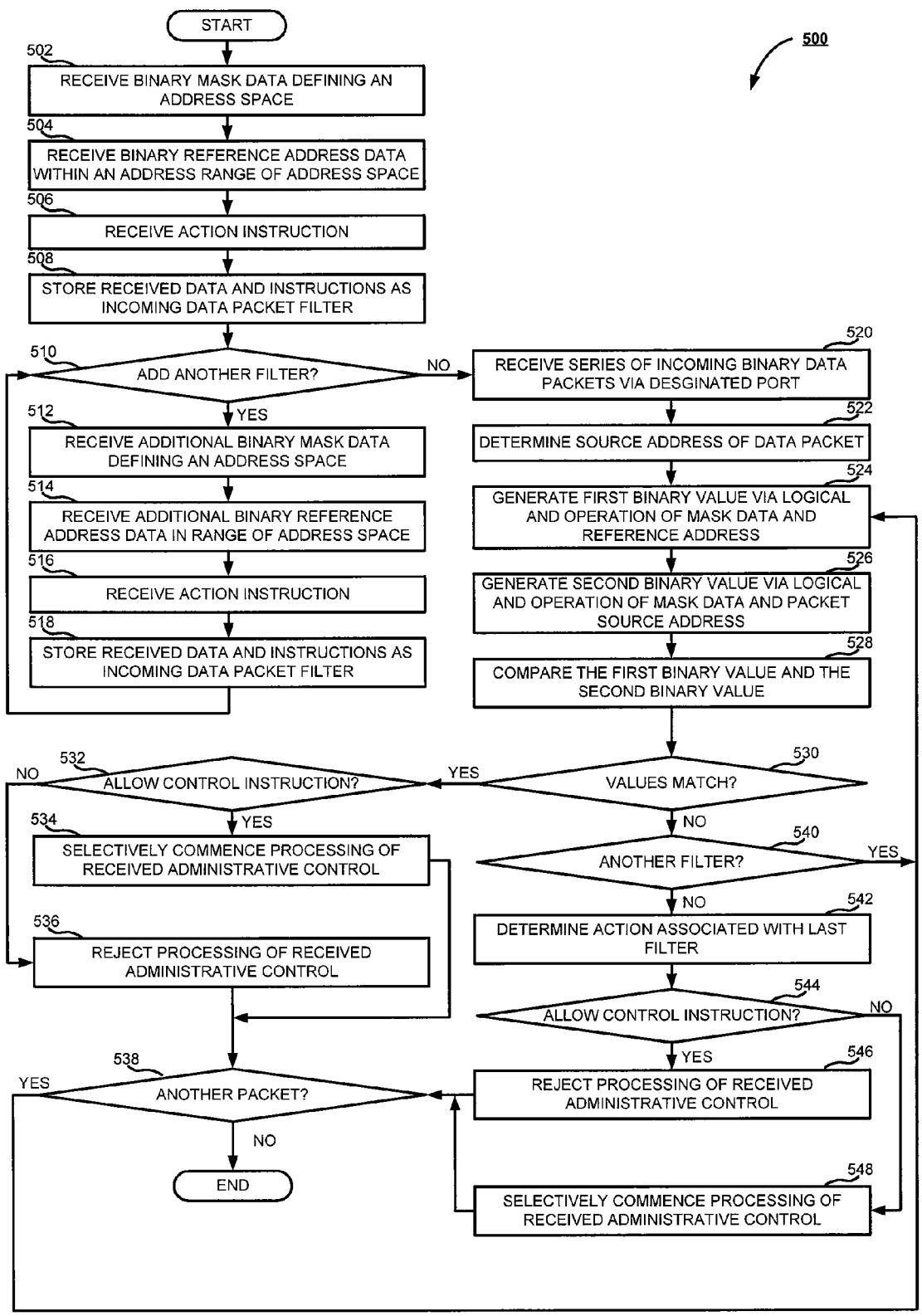
FIG. 5 is a flowchart illustrating a method for securing remote administrative access to a processing device according to one embodiment of the subject application.

Referring now to FIG. 5, there is shown a flowchart 500 illustrating a method for securing remote administrative access to a processing device in accordance with one embodiment of the subject application. It will be appreciated by those skilled in the art that while reference is made hereinafter to a document processing device 104, any suitable electronic device coupled to the computer network 102 is capable of implementing the remote administrative access of the subject application. In accordance with one embodiment, an administrative user, via a thin client interface of the administrative device 118, initiates a graphical user interface to facilitate the selection of filter components, such as that depicted as the template screen 600 in FIG. 6. Explanation, where applicable, is made hereinafter of FIG. 6 to the methodology described in FIG. 5. Thus, at step 502, an administrative user, via the graphical user interface 600, inputs a mask address 602, which is received by the controller 108 or other suitable component of the document processing device 104. At step 504, a binary reference address 604 within a range of addresses defined by the address space of the mask data is then received from the administrator via the administrative device 118.

At step 506, the administrative user inputs an action instruction 606 corresponding to an action to be performed upon the receipt of an incoming data packet having a source address within the address range defined by the mask and the reference address. As shown in FIG. 6, the administrative user selects the allow action to allow the incoming data packet, enabling the processing of control commands contained therein, or the reject action to reject the incoming data packet, whereupon the data is ignored and the application sending the data is kept ignorant of the blocking of the packet. The received mask data and reference address are then stored at step 508 as a filter by the controller 108 or other suitable component of the document processing device 104 via the storage device 110.

A determination is then made at step 510 whether another filter is to be added via the graphical user interface 600 displayed on the administrative device 118 via the thin client. A positive determination at step 510 prompts the user to select an additional binary mask defining an address space at step 512. At step 514, a reference address associated with the additional binary mask is received from the administrative device 118 by the controller 108 associated with the document processing device 104. The desired action associated with the additional filter is then received from the administrative user at step 516. The additional filter is then stored in the data storage device 110 for implementation by the controller 108 upon receipt of any incoming data packets at step 518, whereupon flow returns to step 510.

When no additional filters are to be added by the administrative user at step 510, the filters reside in the data storage device 110 until an incoming binary data packet is received by the controller 108. Flow then proceeds to step 520, whereupon a series of incoming binary data packets are received by the controller 108 of the document processing device 104. At step 522, the source address of the first incoming data packet in the series is determined. In accordance with one embodiment of the subject application, the source address corresponds to data representing the originating device, e.g., the user device 114, as included in the data packet.

A first binary value is then generated at step 524 by the controller 108 corresponding to a logical AND operation performed on the binary mask data and the reference address data. At step 526, a second binary value is generated via a logical AND operation on the binary mask data and the source address of the incoming data packet. A suitable example of such operations is set forth in greater detail above. The first and second binary values are then compared at step 528 so as to determine, at step 530, whether the two values match. When a match is determined at step 530, flow proceeds to step 532, whereupon a determination is made whether the action associated with the filter is an allow action. When the instruction is an allow command, flow then proceeds to step 534, whereupon the data portion of the packet adapted for communicating administrative control data for administrative control of the document processing device 104 is allowed and processed via the controller 108 or other suitable component associated with the document processing device 104. A negative determination at step 532 prompts the rejection, at step 536, of the processing of the administrative control data, i.e., the incoming data packet administrative control data is ignored and not passed on to the controller 108 for implementation. A determination is then made at step 538 whether or not an additional incoming data packet has been received.

When an additional incoming data packet has been received, operations return to step 524, whereupon a first binary value is generated via a logical AND operation of the mask data and the reference address data. Operations continue through steps 526 to 530 as set forth above. When the comparison performed at step 528 does not result in a match of the results of the logical AND operations at step 530, flow proceeds to step 540, whereupon a determination is made whether an additional filter is present. When another filter is present, flow returns to step 524, whereupon a first binary value is generated via a logical AND operation of the mask data of the additional filter and the corresponding reference address data. A second binary value is generated via a logical AND operation of the additional filter mask data and the source address of the additional data packet at step 526. The first and second binary values are then compared at step 528 to determine whether a match has occurred at step 530. When a match has been determined, operations continue as set forth above via steps 532 to 538.

When it is determined at step 540 that no additional filters are present, and the first and second binary values of the additional incoming data packet do not match the last filter set by the administrative user, flow proceeds to step 542, whereupon the action set for the last filter is determined, e.g., whether the action associated with the last filter is an allow or reject action. A determination is then made whether the instruction associated with the last filter is an allow action at step 544. When the action associated with the last filter is an allow instruction, flow proceeds to step 546, whereupon the additional incoming data packet is rejected. When the action associated with the last filter is not an allow instruction, e.g., it is a reject instruction, the additional incoming data packet is allowed at step 548, whereupon the administrative control of the document processing device 104 is selectively commenced in accordance with the administrative control data contained within the additional incoming data packet. Operations return to step 538 for a determination whether any additional data packets remain in the series of incoming data packets. When no further packets have been detected, the operation terminates. When additional data packets are detected, operations return to step 524, whereupon the first filter is applied to the incoming data packet in accordance with the method set forth above.

The skilled artisan will appreciate that such operations continue for each incoming binary data packet received by the document processing device 104. Thus, the administrative user is able to set, for example, an allow instruction for data packets originating from the network address of the administrative device 118, while setting a filter to reject data packets originating from the network address of the user device 114.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for securing remote administrative access to a processing device including a processor operative under programmed instructions comprising:
   means for receiving a series of incoming binary data packets at a designated port of an associated document processing device, the designated port being associated with administrative control of the associated document processing device, each data packet including source data, destination data, and a data portion for communicating administrative control data for configuration of the document processing device;
   means for receiving binary mask data defining an address space from which remotely generated requests for administrative control of the document processing device is acceptable;
   means for storing received binary mask data on a data storage local to the document processing device;
   means for receiving binary reference address data representative of at least one address within an address range defined by the address space;
   means for generating a first binary value in accordance with a comparison of the binary reference address data with the binary mask data;
   means for generating a second binary value in accordance with a comparison of an incoming first binary data packet with the binary mask data, wherein the first binary data packet is incoming at the designated port associated with the administrative control of the associated document processing device;
   determining means for determining acceptability of the incoming first binary data packet in accordance with a comparison of the first and the second binary values associated therewith; and
   means for selectively commencing, by the associated document processing device, processing of received administrative control data of the incoming first binary data packet in accordance with an output of the determining means.

2. The system of claim 1 wherein the determining means include means for determining acceptable incoming binary data as that disposed within the address range in accordance with a received range allow instruction.

3. The system of claim 1 wherein the determining means includes means for determining acceptable incoming binary data as that disposed outside the address range in accordance with a received range reject instruction.

4. The system of claim 1 wherein first and second binary values are generated by completion of a respective logical AND operations between mask data with received binary reference data and mask data with an incoming data packet.

5. The system of claim 4 further comprising:
   means for receiving additional binary mask data defining at least one additional corresponding address space from which remotely generated requests for configuration is acceptable;
   means for receiving additional binary reference address data representative of at least one additional corresponding address within an address range defined thereby;
   means for generating at least one additional first binary value, each corresponding to a comparison of the additional binary reference address data with the additional binary mask data;
   means for generating at least one additional second binary value in accordance with a comparison of an incoming second binary data packet with the additional binary mask data; and the determining means including means for determining acceptability of the incoming second binary data packet in accordance with a comparison of the additional first and second binary values.

6. The system of claim 1 wherein mask data and reference address data is received via an associated thin client interface.

7. A method for securing remote administrative access to a processing device comprising the steps of:
  receiving a series of incoming binary data packets at a designated port of an associated document processing device, the designated port being associated with administrative control of the associated document processing device, each data packet including source data, destination data, and a data portion for communicating administrative control data for configuration of the document processing device;
  receiving binary mask data defining an address space from which remotely generated requests for administrative control of the document processing device is acceptable;
  storing received binary mask data on a data storage local to the document processing device;
  receiving binary reference address data representative of at least one address within an address range defined by the address space;
  generating a first binary value in accordance with a comparison of the binary reference address data with the binary mask data;
  generating a second binary value in accordance with a comparison of an incoming first binary data packet with the binary mask data, wherein the first binary data packet is incoming at the designated port associated with the administrative control of the associated document processing device;
  determining acceptability of the incoming first binary data packets in accordance with a comparison of the first and the second binary values associated therewith; and
  selectively commencing, by the associated document processing device, processing of received administrative control data of the incoming first binary data packets in accordance with an output of the determining step.

8. The method of claim 7 wherein the step of determining acceptability of incoming binary packets includes determining acceptable incoming binary data as that disposed within the address range in accordance with a received range allow instruction.

9. The method of claim 7 wherein the step of determining acceptability of incoming binary packets includes determining acceptable incoming binary data as that disposed outside the address range in accordance with a received range reject instruction.

10. The method of claim 7 wherein first and second binary values are generated by completion of a respective logical AND operations between mask data with received binary reference data and mask data with an incoming data packet.

11. The method of claim 10 further comprising the steps of:
  receiving additional binary mask data defining at least one additional corresponding address space from which remotely generated requests for configuration is acceptable;
  receiving additional binary reference address data representative of at least one additional corresponding address within an address range defined thereby;
  generating at least one additional first binary value, each corresponding to a comparison of the additional binary reference address data with the additional binary mask data;
  generating at least one additional second binary value in accordance with a comparison of an incoming second binary data packet with the additional binary mask data; and
  determining acceptability of the incoming second binary data packet in accordance with a comparison of the additional first and second binary values.

12. The method of claim 7 wherein mask data and reference address data is received via an associated thin client interface.

13. A computer-implemented method for securing remote administrative access to a processing device comprising the steps of:
  receiving a series of incoming binary data packets at a designated port of an associated document processing device, the designated port being associated with administrative control of the associated document processing device, each data packet including source data, destination data, and a data portion for communicating administrative control data for configuration of the document processing device;
  receiving binary mask data defining an address space from which remotely generated requests for administrative control of the document processing device is acceptable;
  storing received binary mask data on a data storage local to the document processing device;
  receiving binary reference address data representative of at least one address within an address range defined by the address space;
  generating a first binary value in accordance with a comparison of the binary reference address data with the binary mask data;
  generating a second binary value in accordance with a comparison of an incoming data packet with the binary mask data, wherein the first binary data packet is incoming at the designated port of the associated document processing device;
  determining acceptability of the series of incoming binary data packets in accordance with a comparison of the first and the second binary values associated therewith; and
  selectively commencing, by the associated document processing device, processing of received administrative control data of the series of incoming binary data packets in accordance with an output of the determining step.

14. The computer-implemented method of claim 13 wherein the step of determining acceptability of incoming binary packets includes determining acceptable incoming binary data as that disposed within the address range in accordance with a received range allow instruction.

15. The computer-implemented method of claim 13 wherein the step of determining acceptability of incoming binary packets includes determining acceptable incoming binary data as that disposed outside the address range in accordance with a received range reject instruction.

16. The computer-implemented method of claim 13 wherein first and second binary values are generated by completion of a respective logical AND operations between mask data with received binary reference data and mask data with an incoming data packet.

17. The computer-implemented method of claim 16 further comprising the steps of:
  receiving additional binary mask data defining at least one additional corresponding address space from which remotely generated requests for configuration is acceptable;
  receiving additional binary reference address data representative of at least one additional corresponding address within an address range defined thereby;

generating at least one additional first binary value, each corresponding to a comparison of the additional binary reference address data with the additional binary mask data;

generating at least one additional second binary value in accordance with a comparison of an incoming second binary data packet with the additional binary mask data; and determining acceptability of the incoming second binary data packet in accordance with a comparison of the additional first and second binary values.

18. The computer-implemented method of claim 13 wherein mask data and reference address data is received via an associated thin client interface.

* * * * *